United States Patent [19]
Haddad et al.

[11] Patent Number: 6,023,876
[45] Date of Patent: Feb. 15, 2000

[54] LURE CONTAINER

[76] Inventors: Richard Y. Haddad, 2315 Morrow Rd., Pittsburgh, Pa. 15241; David C. Cross, 105 Candlelite Dr., McMurray, Pa. 15317

[21] Appl. No.: 09/172,573

[22] Filed: Oct. 14, 1998

[51] Int. Cl.[7] ................................................ A01K 97/06
[52] U.S. Cl. ................................................ 43/25.2; 43/57.1
[58] Field of Search ................................ 43/25, 25.2, 54.1, 43/57.1; D22/134, 139; 206/315.11; 211/70.8; 224/920; 220/475

[56] References Cited

U.S. PATENT DOCUMENTS

| | | | |
|---|---|---|---|
| D. 217,663 | 5/1970 | Chamberlain | 43/25.2 |
| D. 405,499 | 2/1999 | Beauvais | D22/139 |
| 470,878 | 3/1892 | Mease | 224/421 |
| 570,923 | 10/1896 | Goodspeed | 224/463 |
| 572,993 | 12/1896 | Hudson | 224/425 |
| 1,214,282 | 6/1917 | Day | 43/57.1 |
| 2,225,438 | 12/1940 | Sitek | 43/25.2 |
| 2,767,502 | 10/1956 | Reynolds | 43/25.2 |
| 3,190,027 | 6/1965 | Spangler | 43/25.2 |
| 3,449,851 | 6/1969 | Hall | 43/25.2 |
| 3,940,873 | 3/1976 | Lawless | 43/57.1 |
| 4,015,361 | 4/1977 | O'Reilly et al. | 43/25.2 |
| 4,036,451 | 7/1977 | Pipkin | 242/137.1 |
| 4,081,923 | 4/1978 | Pruncutz | 43/57.1 |
| 4,176,770 | 12/1979 | Griggs et al. | 224/420 |
| 4,193,525 | 3/1980 | Sommers | 224/425 |
| 4,203,245 | 5/1980 | Peterson | 43/25.2 |
| 4,226,347 | 10/1980 | Rice | 224/425 |
| 4,452,003 | 6/1984 | Deutsch et al. | 43/25.2 |
| 4,681,220 | 7/1987 | Beneke | 206/315.11 |
| 4,809,890 | 3/1989 | Tsigadas | 224/425 |
| 4,831,772 | 5/1989 | Gillespie | 45/54.1 |
| 4,862,635 | 9/1989 | Conte | 43/57.1 |
| 4,920,683 | 5/1990 | Weber | 43/25.2 |
| 4,944,111 | 7/1990 | Daniel | 43/25.2 |
| 5,020,264 | 6/1991 | Demski | 43/25.2 |
| 5,114,060 | 5/1992 | Boyer | 224/420 |
| 5,123,199 | 6/1992 | Lysohir et al. | 43/57.1 |
| 5,131,180 | 7/1992 | Ives | 43/25.2 |
| 5,199,208 | 4/1993 | Matchette | 43/25.2 |
| 5,235,775 | 8/1993 | Daughtry | 43/25.2 |
| 5,297,676 | 3/1994 | Coleman | 43/25.2 |
| 5,299,720 | 4/1994 | Koch, III | 224/425 |
| 5,417,354 | 5/1995 | Jones | 206/315.11 |
| 5,505,014 | 4/1996 | Paullin | 43/25.2 |
| 5,515,640 | 5/1996 | Cosby et al. | 43/25.2 |
| 5,533,297 | 7/1996 | Crosby | 43/57.1 |
| 5,588,245 | 12/1996 | Vance | 43/25.2 |
| 5,862,622 | 1/1999 | Sandman | 43/25 |
| 5,887,774 | 3/1999 | Bethune | 224/460 |

FOREIGN PATENT DOCUMENTS

| | | | |
|---|---|---|---|
| 732817 | 4/1966 | Canada | 43/25.2 |

*Primary Examiner*—Michael J. Carone
*Assistant Examiner*—Darren W. Ark
*Attorney, Agent, or Firm*—Webb Ziesenheim Logsdon Orkin & Hanson, P.C.

[57] ABSTRACT

A container for stowing a fishing lure to a rod while still attached to the line comprises a hinged container for receiving a fishing lure that snaps closed, the container having a longitudinal recess for partially encircling a fishing rod and a strap attached to the container for securing the container closed and to the fishing rod.

8 Claims, 2 Drawing Sheets

LURE CONTAINER

BACKGROUND OF THE INVENTION

Fishing lures, especially treble hook lures, are dangerous when out of the water. On the line attached to the rod and reel, they constantly tangle with clothing, other rods and can be a serious personal hazard.

Numerous containers for encapsulating fishing lures when not in the water have been proposed. None has adequately addressed the need for quickly, safely and conveniently stowing the lure on the rod. Moreover, containers for stowing the lure on the rod have not given adequate consideration to holding the container against the rod relying all too much on engaging a ferrule with a hook and then tensioning the line to hold the container in place or they are designed to engage or snap directly on the rod which may scratch or mar the rod.

It is an object of this invention to provide a novel fishing lure container that can be used to safely stow or secure the lure to the rod while still connected to the line.

SUMMARY OF THE INVENTION

Briefly, according to this invention, there is provided a container for stowing a fishing lure comprising a hinged container for receiving a fishing lure that snaps closed, the container having a longitudinal recess for partially encircling a fishing rod and a strap attached to the container for securing the container closed and/or to a fishing rod. Preferably, the container has a generally rectangular tube or a generally cylindrical body, optionally, circular cylindrical, with an elongated cylindrical axis, the container being divided into two parts by a plane including the cylindrical axis. The container has a hinged connection between the two sections on one side of the body and a snap connection between the two sections on the other side of the body. Most preferably, a portion of the body is transparent.

In one embodiment, the longitudinal recess in the container is lined with an elastomeric material and the strap is provided with a Velcro® surface for engaging a Velcro® patch attached to the container. In an alternate embodiment, the strap has a buckle or snap on the end thereof for engaging another portion of the strap.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 1:
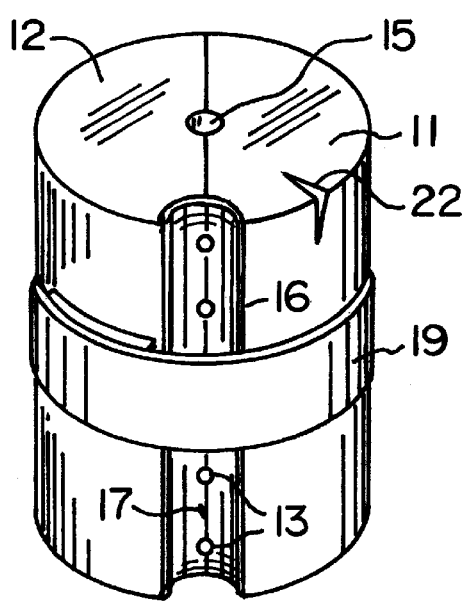
FIG. 1 is a perspective view of a closed lure container according to this invention.
Figure 2:
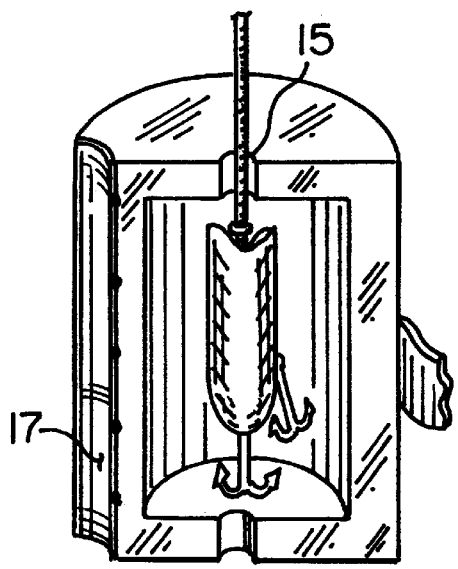
FIG. 2 is a broken away perspective view illustrating the positioning of the lure in the container.
Figure 3:
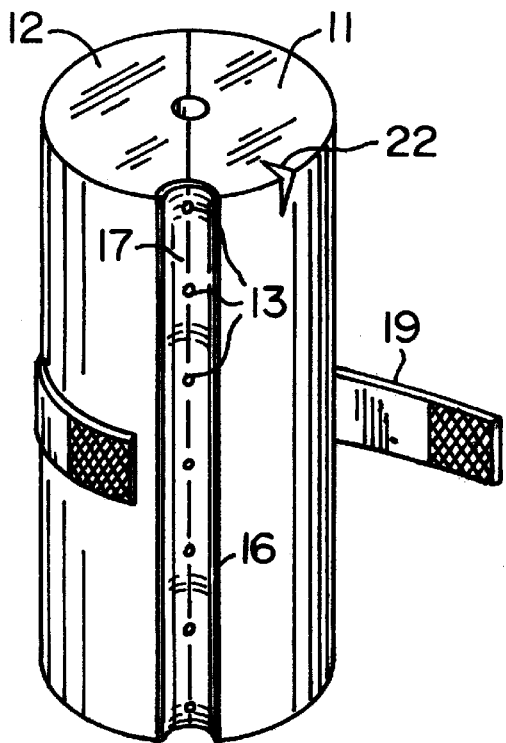
FIG. 3 is similar to FIG. 1 and shows the Velcro® strap opened out.
Figure 4:
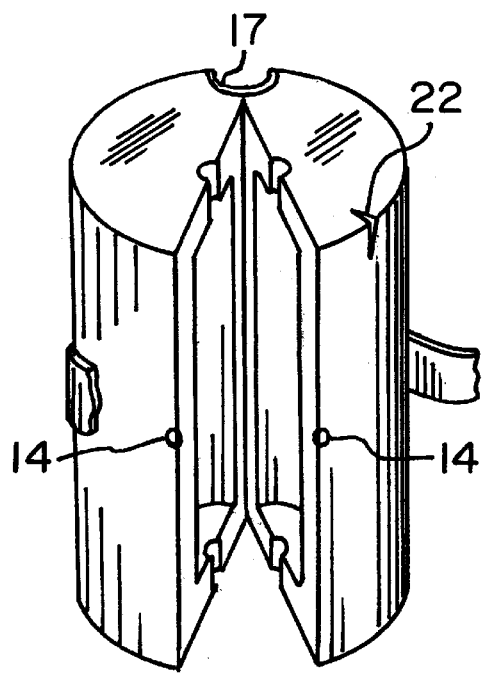
FIG. 4 is a perspective view showing the lure container opened by rotation about the hinge.

Referring now to FIGS. 1 to 5, a fishing lure container according to this preferred embodiment of the invention comprises a generally cylindrical hollow body divided into two semi-cylindrical sections 11, 12 which are joined by hinge 13 and held closed by snap 14 (see FIG. 4). The sections 11, 12, when closed and snapped together, define a hole 15 for the fishing line.

A groove 16 is provided along the hinge 13 for enclosing a portion of the rod. The groove 16 is shown on each side of the hinge 13 that holds the two sections 11, 12 together. However, the groove 16 could be moved onto one section or the other or grooves could be provided on each section. The groove 16 is lined with an elastomer 17, such as foam rubber.

A strap 19 is secured to the body near the hinge 13. The exterior of the strap 19, where it is fastened to the body, has a Velcro® surface. The inside of the distal end of the strap 19 also has a Velcro® surface. The strap 19 must be long enough to reach around the body and the rod and then be secured by the engagement of the Velcro® surfaces.

Figure 5:
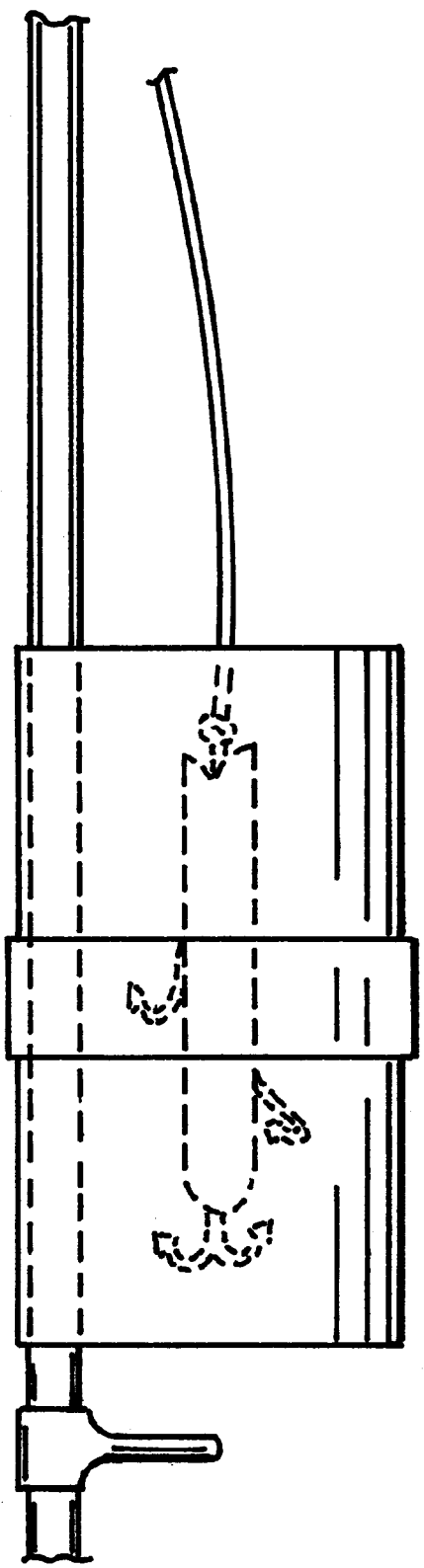
FIG. 5 is a elevation view demonstrating how the lure container will capture the rod.

When the lure is captured in the container and the container is snapped shut, the groove 16 is aligned with the rod and the strap 19 is wrapped around the rod and the container to hold the container on the rod as shown in FIG. 5 to ensure that the container will not come unsnapped.

A number of modifications of the lure container described with reference to the drawings is permissible. The body may, for example, have a rectangular, hexagonal or octagonal cross section. It may, for example, have flat, conical, pyramidal ends. The most suitable material for fabrication of the body would be a clear plastic, although it may be partially clear or entirely opaque. Other materials are possible, for example, colored plastic, metal or wood. The interior of the body must, of course, be large enough to hold the lure with which it will be used. It will typically be 3 to 10 inches long and having a cross-sectional dimension of 1 to 3 inches.

A preferred feature is a small notch or slot 22 in an edge of the container into which a line can be wedged. There are times when it will be desirable to secure an empty line to the container without opening the container.

Having thus defined our invention in the detail and particularity required by the Patent Laws, what is desired protected by Letters Patent is set forth in the following claims.

We claim:

1. A container for stowing a fishing lure to a rod while still attached to a line comprising:

a hinged container for receiving a fishing lure, said container having two sections hinged on one side of the container and a snap connection between the two sections on an other side;

the container having a longitudinal recess on the exterior thereof for partially encircling a fishing rod, wherein the longitudinal recess on the container is lined with an elastomeric material; and a strap attached to the container for securing the container closed and securing the container to a fishing rod by wrapping around the container and the rod.

2. A container for stowing a fishing lure to a rod while still attached to a line comprising:

a hinged container for receiving a fishing lure, said container having two sections hinged on one side of the container and a snap connection between the two sections on an other side, wherein each section has a top surface and an adjacent side surface which intersect to form an edge;

the container having a longitudinal recess on the exterior thereof for partially encircling a fishing rod;

a strap attached to the container for securing the container closed and securing the container to a fishing rod by wrapping around the container and the rod; and a V-shaped notch located on the edge and extending into the top surface and the side surface on one of the sections, wherein the line can be wedged within the notch.

3. The container according to claim 2 having a generally cylindrical body with an elongated cylindrical axis, the container being divided into two sections by a plane including the cylindrical axis.

4. The container according to claim 3 wherein the cylindrical body is circular.

5. The container according to claim 2 or 3 wherein a portion of the body is transparent.

6. The container according to claim 2 or 3 wherein the longitudinal recess on the exterior of the container is lined with an elastomeric material.

7. The container according to claim 2 or 3 wherein the strap is provided with a Velcro® surface for engaging a Velcro® patch attached to the container.

8. The container according to claim 2 or 3 wherein the strap has a buckle or snap on the end thereof for engaging another portion of the strap.

* * * * *